United States Patent
Zajac

(10) Patent No.: US 10,210,765 B2
(45) Date of Patent: Feb. 19, 2019

(54) INFERENCE AND INTERPOLATION OF CONTINUOUS 4D TRAJECTORIES

(71) Applicant: THE BOEING COMPANY, Chicago, IL (US)

(72) Inventor: Michal Zajac, Gdansk (PL)

(73) Assignee: THE BOEING COMPANY, Chicago, IL (US)

( * ) Notice: Subject to any disclaimer, the term of this patent is extended or adjusted under 35 U.S.C. 154(b) by 741 days.

(21) Appl. No.: 14/992,469

(22) Filed: Jan. 11, 2016

(65) Prior Publication Data

US 2018/0108261 A1    Apr. 19, 2018

(51) Int. Cl.
| | |
|---|---|
| G01C 21/34 | (2006.01) |
| G06F 3/00 | (2006.01) |
| G06F 7/00 | (2006.01) |
| G08G 5/00 | (2006.01) |
| G01G 21/20 | (2006.01) |
| G01C 23/00 | (2006.01) |
| G08G 5/04 | (2006.01) |
| G01C 21/20 | (2006.01) |

(52) U.S. Cl.
CPC ........... *G08G 5/0039* (2013.01); *G01C 21/20* (2013.01); *G01C 23/00* (2013.01); *G01G 21/20* (2013.01); *G06F 7/00* (2013.01); *G08G 5/0008* (2013.01); *G08G 5/0013* (2013.01); *G08G 5/0021* (2013.01); *G08G 5/0026* (2013.01); *G08G 5/0034* (2013.01); *G08G 5/045* (2013.01)

(58) Field of Classification Search
CPC .... G08G 5/0039; G08G 5/0013; G08G 5/045; G08G 5/0008; G01C 23/00
See application file for complete search history.

(56) References Cited

U.S. PATENT DOCUMENTS

| | | |
|---|---|---|
| 6,246,957 B1 | 6/2001 | Barrer et al. |
| 7,650,232 B1 | 1/2010 | Paielli |
| 9,685,087 B2 * | 6/2017 | Berckefeldt ......... G08G 5/0008 |

(Continued)

FOREIGN PATENT DOCUMENTS

| | | |
|---|---|---|
| EP | 2667274 A1 | 11/2013 |
| EP | 2667275 A1 | 11/2013 |

OTHER PUBLICATIONS

Miguel A. Vilaplana et al., "Towards a Formal Language for the Common Description of Aircraft Intent", 24th Digital Avionics System Conference, Oct. 5, 2005, pp. 3.C.5-1 to 3.C.5-9.

(Continued)

*Primary Examiner* — Alan D Hutchinson
(74) *Attorney, Agent, or Firm* — MH2 Technology Law Group LLP

(57) ABSTRACT

The present disclosure generally relates to systems and methods for determining a four-dimensional (4D) trajectory of an aircraft without requiring aircraft performance data or meteorological data. The techniques can include: detecting a plurality of 4D aircraft states of the aircraft, determining, for each of a plurality of pairs of adjacent aircraft states, a respective aircraft transition, detecting a plurality of pairs of repeat adjacent aircraft transition, discarding, for each pair of repeat adjacent aircraft transitions, a respective aircraft state from the plurality of aircraft states, and electronically transmitting the plurality of aircraft states after the discarding.

20 Claims, 5 Drawing Sheets

(56) References Cited

U.S. PATENT DOCUMENTS

| | | | |
|---|---|---|---|
| 9,892,647 B2* | 2/2018 | Papageorgiou | G08G 5/04 |
| 2005/0080794 A1* | 4/2005 | Ledingham | G08G 5/0013 |
| 2012/0209515 A1* | 8/2012 | Klooster | G08G 5/0013 |
| | | | 701/439 |
| 2015/0203212 A1* | 7/2015 | Zubairi | B64D 45/00 |
| | | | 701/14 |

OTHER PUBLICATIONS

Heinz Erzberger et al., "4-D guidance system design with application to STOL air traffic control." Joint Automatic Control Conference, No. 10, 1972, pp. 445-454.

Author Unknown, Sesar Website, Copyright 2015, http://www.sesarju.eu/, accessed Jan. 14, 2016, pp. 1-2.

Author Unknown, NextGen, Federal Aviation Administration Website, last modified Oct. 19, 2015, https://www.faa.gov/nextgen/, accessed Jan. 14, 2016, pp. 1-3.

\* cited by examiner

INFERENCE AND INTERPOLATION OF CONTINUOUS 4D TRAJECTORIES

FIELD

This disclosure relates generally to characterizing vehicle trajectories.

BACKGROUND

Four-dimensional (4D) trajectories are a cornerstone of the 4D Trajectory Based Operations (4D TBO) concept, which is a new paradigm in Air Traffic Management (ATM). It is a central idea of future airspace organization in the European Single European Sky ATM Research (SESAR) and U.S. NextGen initiatives.

In prior art techniques, a discrete representation of a 4D trajectory as a series of 4D points introduces certain problems. For example, known techniques require a large size of the trajectory data for a high-resolution trajectory (e.g., sampled every second). Further, some prior art techniques utilize a non-continuous representation with undetermined states between the trajectory points. Prior art solutions attempt to address these problems of providing a continuous description of 4D trajectories; however, the existing solutions are aircraft-centric and require providing some of the aircraft data (aircraft performance) and environmental data (weather) in order to be able to determine the state of an aircraft at any time instance of the trajectory.

SUMMARY

According to various examples, a method of determining a four-dimensional (4D) trajectory of an aircraft without requiring aircraft performance data or meteorological data is presented. The method includes: detecting a plurality of aircraft states of the aircraft, each aircraft state including a latitude value, a longitude value, an altitude value, and a time value, such that the plurality of states of the aircraft are stored in electronic memory in temporal order; determining, for each of a plurality of pairs of adjacent aircraft states, a respective aircraft transition, each transition including a planar turn radius value, a vertical turn radius value, and an acceleration value, such that a plurality of aircraft transitions are stored in electronic memory in temporal order; detecting a plurality of pairs of repeat adjacent aircraft transitions including: respective planar turn radii values whose difference is no more than a first threshold, respective vertical turn radii values whose difference is no more than a second threshold, and respective acceleration values whose difference is no more than a third threshold; discarding, for each pair of repeat adjacent aircraft transitions, a respective aircraft state from the plurality of aircraft states, such that an amount of data for the plurality of states of the aircraft stored in electronic memory is reduced; and electronically transmitting the plurality of aircraft states after the discarding.

Various optional features of the above examples include the following. The detecting may be performed by the aircraft. The detecting may be performed by a terrestrial system. The determining, for each of the plurality of pairs of adjacent aircraft states, the respective aircraft transition may include computing respective headings at each aircraft state of a respective pair of adjacent aircraft states. The determining, for each of the plurality of pairs of adjacent aircraft states, the respective aircraft transition may include computing respective pitches at each aircraft state of a respective pair of adjacent aircraft states. The determining, for each of the plurality of pairs of adjacent aircraft states, the respective aircraft transition may include computing respective speeds at each aircraft state of a respective pair of adjacent aircraft states. The electronically transmitting may include electronically transmitting from the aircraft to a ground station. The electronically transmitting may include electronically transmitting from a ground station to the aircraft. The method may include interpolating an interpolated trajectory of the aircraft based on the plurality of aircraft states; detecting a potential conflict with a second aircraft based on the interpolated trajectory; and resolving the conflict. The first threshold, the second threshold, and the third threshold may all be zero. The electronically transmitting may include electronically transmitting from a first aircraft system to a second aircraft system. The second aircraft system may include a Flight Management System (FMS), and the method may further include updating, by the FMS, a flight plan for the aircraft (702) to represent at least a portion of a trajectory interpolated from the plurality of aircraft states (104), such that an updated flight plan is produced. The method may include directing, by the FMS, the aircraft to follow the updated flight plan.

According to various examples, a system for determining a four-dimensional (4D) trajectory of an aircraft without requiring aircraft performance data or meteorological data is presented. The system includes a communications interface configured to detect a plurality of aircraft states of the aircraft, each aircraft state including a latitude value, a longitude value, an altitude value, and a time value, such that the plurality of states of the aircraft are stored in electronic memory in temporal order; at least one electronic processor configured to: determine, for each of a plurality of pairs of adjacent aircraft states, a respective aircraft transition, each transition including a planar turn radius value, a vertical turn radius value, and an acceleration value; store a plurality of aircraft transitions in electronic memory in temporal order; detect a plurality of pairs of repeat adjacent aircraft transitions including: respective planar turn radii values whose difference is no more than a first threshold, respective vertical turn radii values whose difference is no more than a second threshold, and respective acceleration values whose difference is no more than a third threshold; discard from the electronic memory, for each pair of repeat adjacent aircraft transitions, a respective aircraft state from the plurality of aircraft states, such that a filtered plurality of aircraft states is produced, and such that an amount of data stored in electronic memory is reduced; and a transmitter configured to electronically transmit the filtered plurality of aircraft states.

Various optional features of the above examples include the following. The system may include instrumentation aboard the aircraft configured to detect the plurality of aircraft states of the aircraft. The system may include instrumentation present in a ground station configured to detect the plurality of aircraft states of the aircraft. The at least one electronic processor configured to determine, for each of the plurality of pairs of adjacent aircraft states, the respective aircraft transition, may be further configured to compute respective headings at each aircraft state of a respective pair of adjacent aircraft states. The at least one electronic processor configured to determine, for each of the plurality of pairs of adjacent aircraft states, the respective aircraft transition, may be further configured to compute respective pitches at each aircraft state of a respective pair of adjacent aircraft states. The at least one electronic processor configured to determine, for each of the plurality of pairs of adjacent aircraft states, the respective aircraft transition, may be further configured to compute respective speeds at each aircraft state of a respective pair of adjacent aircraft states. The transmitter may include a wireless transmitter present aboard the aircraft. The transmitter may include a wireless transmitter present at a ground station. The system may further include at least one electronic processor configured to: interpolate an interpolated trajectory of the aircraft based on the filtered plurality of aircraft states; detect a potential conflict with a second aircraft based on the interpolated trajectory; and resolve the conflict. The first threshold, the second threshold, and the third threshold may all be zero. The transmitter may be configured to electronically transmit the filtered plurality of aircraft states from a first aircraft system to a second aircraft system. The second aircraft system may include a Flight Management System (FMS) configured to update a flight plan for the aircraft (702) to represent at least a portion of a trajectory interpolated from the plurality of aircraft states (104), such that an updated flight plan is produced. The FMS may be further configured to direct the aircraft to follow the updated flight plan.

Various disclosed examples solve the problem of excessive data used to represent vehicle trajectories. For example, vehicle trajectory data that is sampled (e.g., at 1 Hz) and wirelessly transmitted as-is is relatively bulky, thus requiring a large bandwidth to transmit and process. This can reduce bandwidth used for other applications, causing aircraft and terrestrial station system sluggishness. Some examples of the disclosed subject matter reduce the amount of trajectory data by 95-99%, a large savings in both processing and transmission requirements.

BRIEF DESCRIPTION OF THE DRAWINGS

Various features of the examples can be more fully appreciated, as the examples become better understood with reference to the following detailed description, when considered in connection with the accompanying figures, in which.

DESCRIPTION

Figure 1:
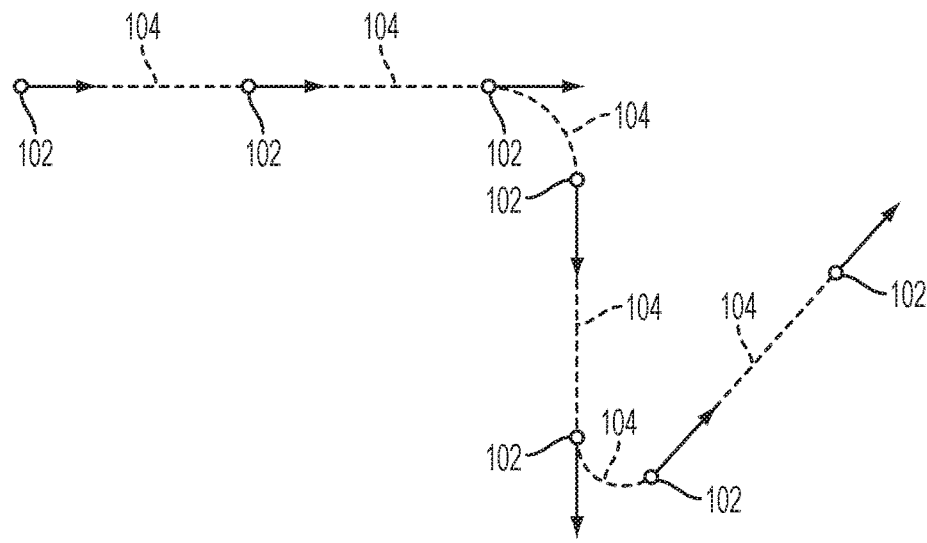
FIG. 1 is a schematic diagram of an aircraft trajectory.

Reference will now be made in detail to the disclosed examples, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific examples. These examples are described in sufficient detail to enable those skilled in the art to practice them and it is to be understood that other examples may be utilized and that changes may be made without departing from the scope of the disclosure. The following description is, therefore, merely exemplary.

Some examples disclosed herein provide a technique for describing and completely characterizing a four-dimensional (4D) trajectory of an aircraft using substantially less data than prior art techniques. That is, some examples operate using reduced bandwidth, in comparison to prior art techniques, for transmitting trajectory information. Such a reduced bandwidth results in reduced cost to airlines, with an estimated potential monetary savings of over 95%. Further, some examples operate with a limited need for complex infrastructures to accurately reproduce the 4D trajectory in ground and air systems. This results in reduced cost to airlines and air navigation service providers like the Federal Aviation Administration (FAA). Some examples provide for efficient representation of an aircraft trajectory without requiring knowledge of the aircraft's performance parameters or contextual meteorological conditions, such as ambient wind and temperature. Some examples may be used to efficiently provide trajectory information for use with air traffic management, for example. These and other advantages are described in detail herein.

Some examples disclosed herein solve the problem of providing unambiguous and efficient continuous 4D trajectories. The disclosed techniques allow for describing a 4D trajectory by leaving out the aircraft-related and environment-related information. This allows for very simple and efficient representation of the trajectory without dependency on the characteristics of the objects executing the trajectory. At the same time, the disclosed techniques specify the way of inferring some of the kinematic properties (velocity, acceleration) of that object.

Such representation of 4D trajectories can be particularly useful for the efficient transmission of trajectory information from and to an aircraft (e.g., via Automatic Dependent Surveillance—Contract, "ADS-C") and interpretation of the transmitted data to obtain unambiguous, continuous 4D trajectories. The techniques can also be used as an intermediate representation of reference trajectories in an aircraft Flight Management System (FMS) as a step between a flight plan and respective aircraft intent. Another application area is efficient conflict detection and resolution.

Some examples disclosed herein enjoy one or more of the following advantages. Some examples provide a simple 4D trajectory representation, which requires no new data structures or custom objects (they can use any existing representation in which 4D trajectory is stored as a series of 4D points). Some examples provide a way to interpret the data that is contained in a series of 4D states, as well as a way of producing series of 4D points representing arbitrary 4D trajectory. Some examples provide for continuous representation of 4D trajectories. Some examples allow for inferring some of the kinematic properties of the object executing the trajectory (e.g., velocity, acceleration). Some examples allow for representing historical states together with the current state of the object on the trajectory. Some examples allow for efficient representation of a trajectory with a minimal number of elements required to reliably represent a 4D trajectory. Examples can be easily customized, for example, by providing extensions to the basic inference mechanism (e.g., custom acceleration model). Some examples provide an aircraft-independent representation of 4D trajectories, thus there is no requirement for a complex trajectory generation/prediction engine to produce or reproduce the representation of a trajectory (though examples can use a trajectory predictor to produce the representation of a trajectory which is flyable by a certain type of an aircraft). These and other features and advantages are presented herein.

FIG. 1 is a schematic diagram of an aircraft trajectory, depicting states 102 and transitions 104 according to some examples. Consider an object travelling along a trajectory (i.e., a path over time). It is reasonably assumed, and in fact true for aircraft, that the velocity of that object is tangential to the path at all times. Thus, FIG. 1 depicts tangent vectors as arrows originating from each depicted state 102. It is also reasonably assumed that the path can be approximated as a series of straight segments and planar or vertical circular turns of variable radii.

Thus, as depicted in FIG. 1, some examples use the following primitive elements when processing trajectories. First, some examples use "states" 102, that is, 4D discrete points that include 3D coordinates and time. The 3D coordinates may be Cartesian (x,y,z) or geodetic (latitude, longitude, altitude), or another representation of positions in 3D space. Second, some examples use "transitions" 104, that is, elements that describe changes in one or more of heading, pitch and velocity over time.

As disclosed, transitions can be inferred from states. A special case of a transition is the constant transition when no change in heading, pitch or velocity over time occurs.

Figure 2:
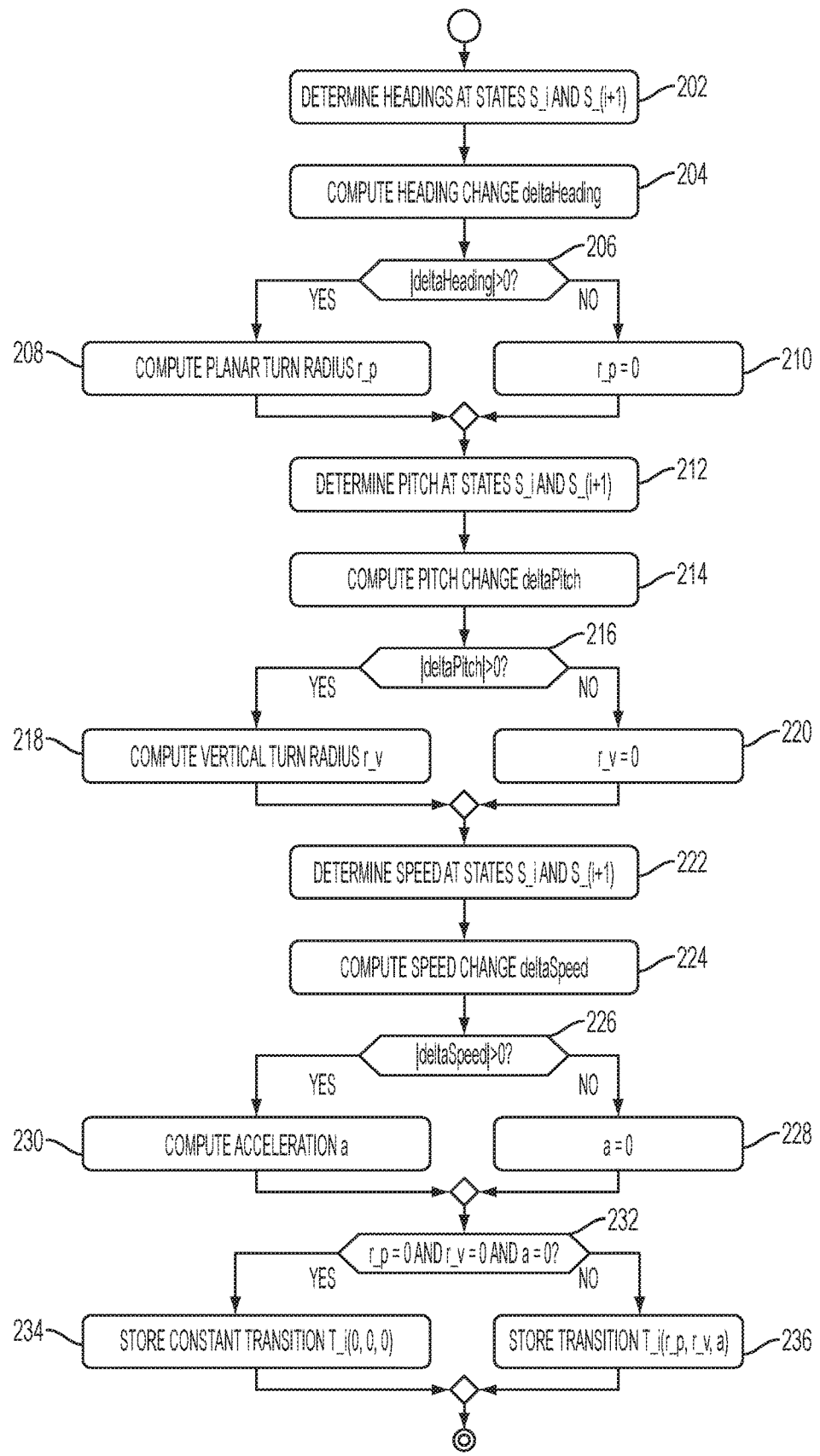
FIG. 2 is a flowchart depicting a technique for determining aircraft transitions from aircraft states according to some examples.

FIG. 2 is a flowchart depicting a technique for determining aircraft transitions from aircraft states according to some examples. The technique of FIG. 2 may be implemented by properly configured computer hardware, e.g., ground station and/or aircraft computer hardware as shown and described in reference to FIG. 7. As noted, a trajectory can be described as a sequence $S=(S_1, S_2, \ldots, S_n)$ of n temporally-ordered four-dimensional states (where n>1). Based on a set of rules provided herein, and given an input of a 4D trajectory sequence of states, some examples infer one or more of the heading angle, the pitch angle and the speed of the described object at each particular state of the input sequence, as well as transitions between those states, according to the technique shown in FIG. 2 and described presently.

Note that, in general, transitions describe how heading, pitch and/or velocity evolve over time between any two consecutive states. A transition can be realized as a straight line planar (great circle in the geodetic coordinates case), straight line vertical, or a turn (planar/vertical) with the radius determined by the change in heading between two subsequent states. A transition can be characterized by no change (constant transition) or any combination of changes (changing transition), thus a transition can be denoted by a triad as follows: $(r_p, r_v, a)$, where $r_p$ denotes planar turn radius, $r_v$ denotes vertical turn radius, and a denotes acceleration. In general, such triads may be denoted by the symbol "T" or variations thereof.

As described herein in detail, some examples of the disclosed subject matter filter out redundant aircraft states based on detecting and discarding equal or approximately corresponding transitions to achieve a compact low-memory representation of a trajectory by the remaining states. Two transitions T and T' are considered "equal" if and only if the radius of the planar turn $r_p$, the radius of the vertical turn $r_v$, and the acceleration a are equal in those transitions. Note that any two constant transitions are equal. Two transitions T and T' are considered "approximately equal" if and only if the differences in the values of the radii of the planar turn, the radii of the vertical turn and the accelerations are smaller than certain defined error thresholds. In symbols, for thresholds $\varepsilon_{rp}>0$, $\varepsilon_{rv}>0$, and $\varepsilon_a>0$, two transitions $T_1=(r_{p1}, r_{v1}, a_1)$ and $T_2=(r_{p2}, r_{v2}, a_2)$, are said to be "approximately equal" if and only if $|r_{p1}-r_{p2}|<\varepsilon_{rp}$ and $|r_{v1}-r_{v2}|<\varepsilon_{rv}$ and $|r_{a1}-r_{a2}|<\varepsilon_a$. A transition formed by the component-wise difference between two approximately equal transitions is said to be "approximately constant".

The error thresholds for the "approximately equal" determination may be selected according to a variety of techniques. For example, the error threshold may be selected to be, e.g., 1% of average values for these quantities. In general, the values of the thresholds may be application-dependent. Further, selecting the threshold values may involve a compromise between the size of the trajectory representation (number of 4D points) and its accuracy. An example rule for selecting the thresholds to represent a sufficiently accurate 4D trajectory of an aircraft is to account for the deadband or uncertainty of the control system of the aircraft. For example, the values of the thresholds may be set to one-half of the values of deadband size for the respective parameter (e.g., turn radii or acceleration).

The flowchart of FIG. 2 depicts a technique for inferring a transition $T_i$, from two corresponding consecutive states $S_i$, and $S_{i-1}$ (i=1, ..., n). This technique may be applied at any position of a sequence of states; that is, the technique need not begin at $T_0$ or $T_1$. Details of particular steps of the technique according to some examples are given by the following. Note that the following description is presented using Cartesian 3D coordinates for the spatial components of a state for simplicity; in examples, spatial components of a state may be geodetic. Further, by convention, the turn radius of a straight line transition (i.e., no turn occurs) is equal to zero.

At block 202, the technique determines headings at the given states $S_i$ and $S_{i+1}$. Given an input series of states of length L≥2, the heading angle $h_i$ (i=2, ..., L) can be inferred from the states $S_{i+1}$ and $S_i$ as follows, by way of non-limiting example.

If i=2 (or another initial value of i) then $h_1=h_2=\text{atan2}(d_y, d_x)$, where atan2(·) is the two-argument arctangent function and $d_y=y_2-y_1$ and $d_x=x_2-x_1$ are the distances between $S_2$ and $S_1$ in the y and x coordinates respectively.

If i>2, then $h_i=2\text{atan2}(d_y, d_x)-h_{i-1}$, where $d_y=y_i-y_{i-1}$ and $d_x=x_i-x_{i-1}$ are the distances between $S_i$ and $S_{i-1}$ in the y and x coordinates respectively.

At block 204, the technique computes the heading change between the given states. The heading change may be computed as a numerical difference between respective headings.

At block 206, the technique determines whether the heading difference is non-zero. If not (210), the technique proceeds to block 212. Otherwise (208), the technique proceeds to determine the planar radius. The following is a non-limiting example determination. Given the input series of trajectory states of length L≥2, the planar radius $r_{p\_i}$ (i=2, ..., L) can be inferred from the states $S_{i-1}$ and $S_i$, and the respective heading angles $h_{i-1}$ and $h_i$ as $r_{p\_i-1}=d_{p\_i}(S_i, S_{i-1})/(2 \sin((h_i-h_{i-1})/2))$, where and $d_{p\_i}=((y_i-y_{i-1})^2+(x_i-x_{i-1})^2)^{0.5}$ is the planar distance between $S_i$ and $S_{i-1}$.

At block 212, the technique determines respective pitches at the given states. Given the input series of trajectory states of length L≥2, the pitch angle $p_i$ (i=2, ..., L) can be inferred from the states $S_{i-1}$ and $S_i$ as follows, by way of non-limiting example.

If i=2, then $p_1=p_2=\text{atan2}(d_z, d_p)$, where atan2(·) is the two-argument arctangent function, $d_p=((y_2-y_1)^2+$ $(x_2-x_1)^2)^{0.5}$ is the planar distance between $S_2$ and $S_1$, and $d_z=z_2-z_1$ is the distance between $S_2$ and $S_1$ in the z-axis direction.

If i>2, then $p_i=2\text{atan}2(d_z, d_{p\_i})-p_{i-1}$, where $d_{p\_i}=((y_i-y_{i-1})^2+(x_i-x_{i-1})^2)^{0.5}$ is the planar distance between $S_i$ and $S_{i-1}$ and $d_z=z_i-z_{i-1}$ is the distance between $S_{i-1}$ and $S_i$ in the z coordinate.

At block 214, the technique computes the pitch change between the given states. The pitch change may be computed as a numerical difference between respective pitches.

At block 216, the technique determines whether the pitch change is non-zero. If not (220), then the process proceeds to block 222. Otherwise (218), the process determines the vertical turn radius for the respective states. An example vertical radius determination follows. Given the input series of trajectory states of length L≥2, the vertical radius $r_{v\_i}$ (i=1, . . . , L−1) can be inferred from the states $S_{i-1}$ and $S_i$, and the respective pitch angles $p_{i-1}$ and $p_i$ as $r_{v\_i-1}=d_i(S_i, S_{i-1})/(2 \sin((p_i-p_{i-1})/2)$, where and $d_i=\text{sqrt}((y_i-y_{i-1})^2+(x_i-x_{i-1})^2+(z_i-z_{i-1})^2)$ is the distance between $S_i$ and $S_{i-1}$.

At block 222, the technique determines the respective speeds at the given states. Given the input series of trajectory states of length L≥2, the mean speed $\tilde{v}_i$ at the i-th transition (i=2, . . . , L) can be inferred from the states $S_{i-1}$ and $S_i$, the planar radius $r_{p\_i}$ and the vertical radius $r_{v\_i}$ as follows, by way of non-limiting example.

If $r_{p\_i}=0$ and $r_{v\_i}=0$, then $\tilde{v}_{i-1}=d_i(S_i, S_{i-1})/\Delta t$, where and $d_i=\text{sqrt}((y_i-y_{i-1})^2+(x_i-x_{i-1})^2+(z_i-z_{i-1})^2)$ is the spatial distance and $\Delta t_i=t_i-t_{i-1}$ is the time difference between $S_i$ and $S_{i-1}$.

If $r_{p\_i}\neq 0$ and $r_{v\_i}=0$, then $\tilde{v}_{i-1}=r_{p\_i} (h_i-h_{i-1})/\Delta t_i$, where $h_i-h_{i-1}$ is the heading difference between $S_i$ and $S_{i-1}$.

If $r_{p\_i}=0$ and $r_{v\_i}\neq 0$, then $\tilde{v}_{i-1}=r_{v\_i} (p_i-p_{i-1})/\Delta t_i$, where $p_i-p_{i+1}$ is the pitch difference between $S_i$ and $S_{i-1}$.

If $r_{p\_i}\neq 0$ and $r_{v\_i}\neq 0$, then $\tilde{v}_{i-1}=d_{s\_i}(S_i, S_{i-1})/\Delta t_i$, where $d_{s\_i}(S_i, S_{i+1})$ is the distance between the two points $S_i$ and $S_{i-1}$ on a surface of spheroid given by the equatorial radius $r_{p\_i}$ and the distance from center to pole along the symmetry axis equal to $r_{v\_i}$.

At block 224, the technique computes the speed change between the given states. The speed change may be computed as a numerical difference between respective speeds.

At block 226, the technique determines whether the speed difference is non-zero. If not (228), then the process proceeds to block 232. Otherwise (230), the process proceeds to determine the acceleration between the given states. Given the input series of trajectory states of length L≥2, the acceleration $a_{i-1}$ (i=2, . . . , L) on the transition between states $S_{i-1}$ and $S_i$ together with the velocity $v_i$ at the state $S_i$ can be inferred from the mean velocity $\tilde{v}_{i-1}$ using a constant acceleration model as follows, by way of non-limiting example.

If i=2, then $v_1=0$, $v_2=2 \tilde{v}_i$, and $a_1=v_2/\Delta t_1$, where $\Delta t_1=t_2-t_1$ is the time difference between $S_2$ and $S_1$.

If i>2, then $v_i=2 \tilde{v}_{i-1}-v_{i-1}$, and $a_{i-1}=(v_i-v_{i-1})/\Delta t_i$, where $\Delta t_i=t_i-t_{i-1}$ is the time difference between $S_2$ and $S_1$.

If $v_i<0.5 \tilde{v}_{i-1}$ and $a_{i-1}<0$, then apply a combined deceleration model (see FIG. 3) and compute the values as: $t_a=\tilde{v}_{i-1} \Delta t_i/(v_{i-1}-0.5 \tilde{v}_{i-1})$, and $v_i=0.5 \tilde{v}_{i-1}$, where $t_a$ is the time of the acceleration change. Further, for time t such that $t_{i-1}<t<t_a$ compute the acceleration as $a_{i-1}'=(v_i-v_{i-1})/(t_a-t_i)$, and for time t such that $t_a\leq t<t_{i-1}$ assume the acceleration as $a_{i-1}''=0$.

At block 232, the technique determines whether the transition is constant, that is, whether the planar radius, the vertical radius, and the acceleration are all zero. If so (234), then the transition is determined to be constant. Otherwise (236), the transition between states $S_i$ and $S_{i+1}$ is determined to be $T_i=(r_p, r_v, a)$.

Alternately, at block 232, the technique determines whether the transition is approximately constant, that is, whether the differences in the values of the radii of the planar turn, the radii of the vertical turn and the accelerations are smaller than defined error thresholds. If so, the technique may store a constant transition or, in some embodiments, the approximately constant transition.

Note that blocks 234 and 236 refer to storing certain transitions. Such storage may be in volatile or persistent memory. In some examples, the transitions are temporarily stored in volatile memory for as long as it takes to discard the associated state data if needed, then the respective transition data is discarded as well.

Figure 3:
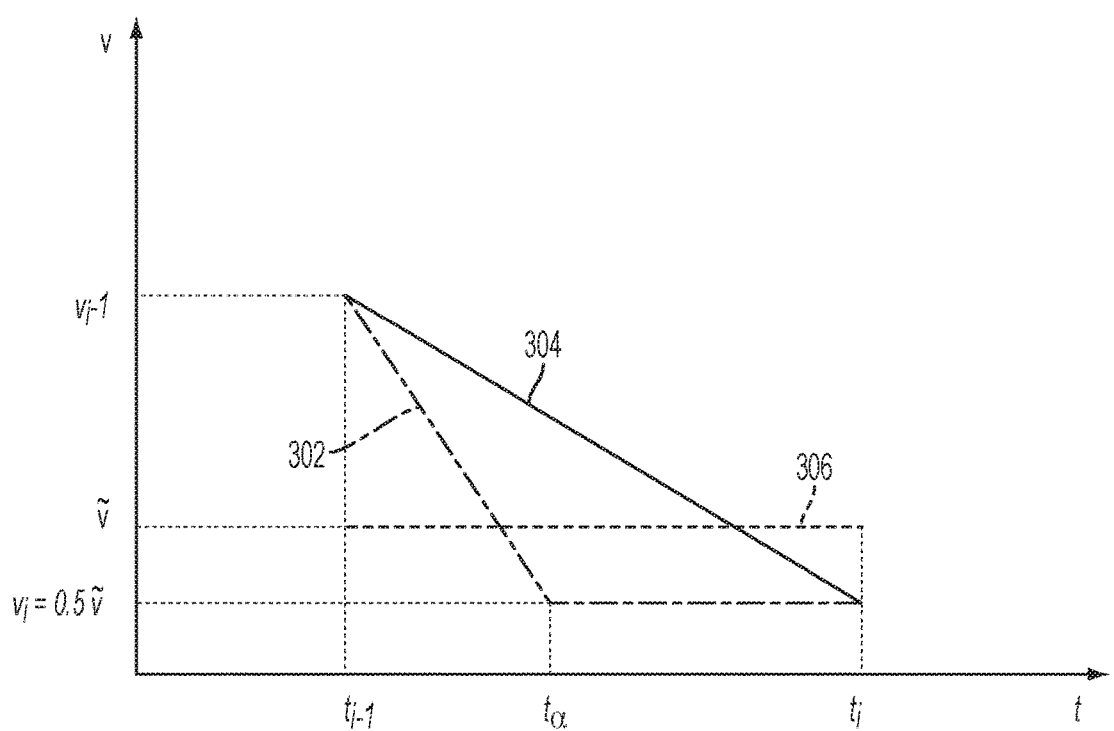
FIG. 3 is a graph depicting a combined deceleration model according to some examples.

FIG. 3 is a graph depicting a combined deceleration model as used to compute acceleration according to some examples (see block 230 of FIG. 2). In particular, FIG. 3 depicts an average speed 306, a constant deceleration 304 (which is insufficient in some examples), and a combined deceleration 302. The combined deceleration model compensates for too high initial speed at a deceleration transition so that the speed value after the transition is equal or greater than half of the value of the average speed on that segment. Other examples can use other acceleration models in place of the proposed simple linear acceleration-based model. One example is a model in which acceleration in transitions is expressed as a quadratic function of time.

Figure 4:
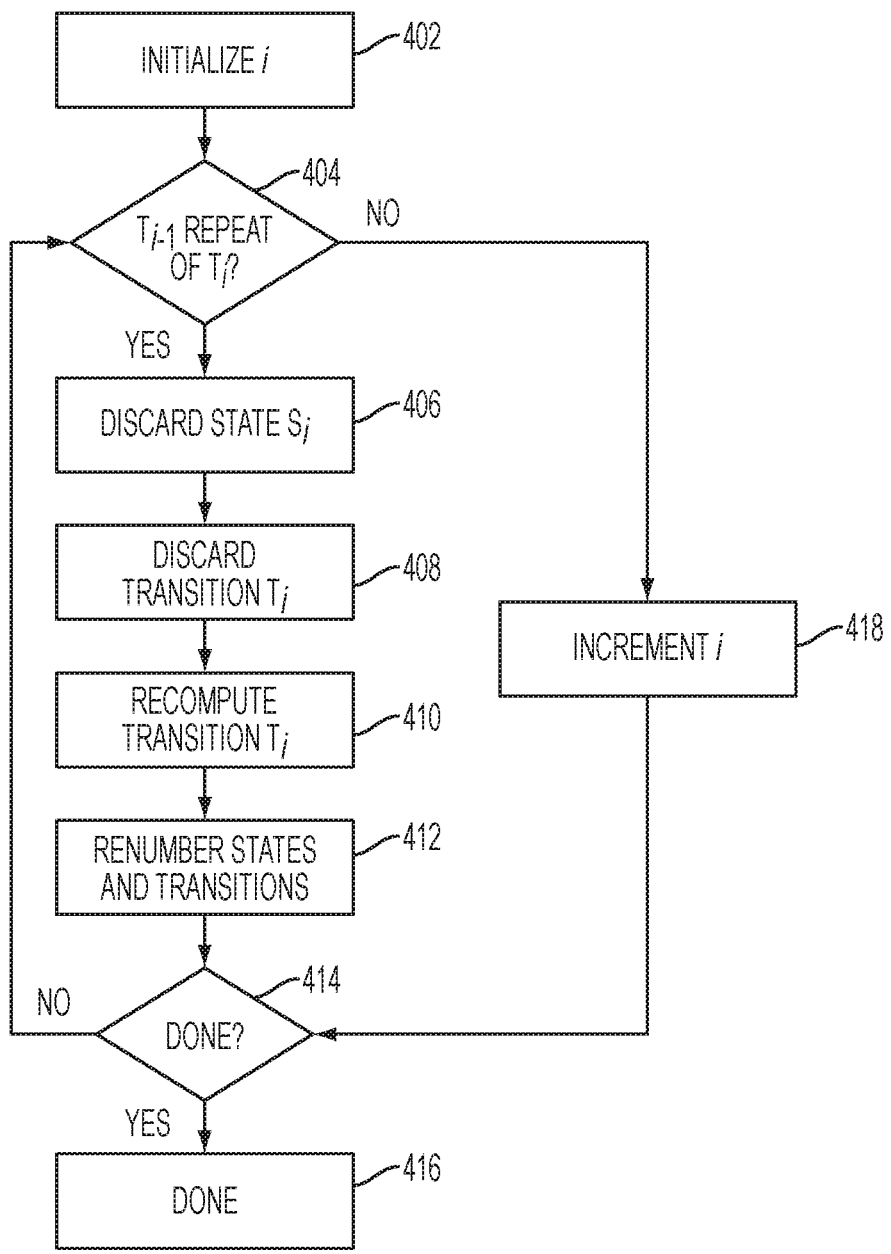
FIG. 4 is a flowchart depicting filtering aircraft states by discarding data according to some examples.

FIG. 4 is a flowchart depicting filtering aircraft states by discarding data according to some examples. The technique of FIG. 4 may be implemented by properly configured computer hardware, e.g., ground station and/or aircraft computer hardware as shown and described in reference to FIG. 7. Given a trajectory representation $S=(S_1, S_2, \ldots, S_n)$ of a 4D trajectory produced according to the techniques described herein, it is possible to simplify the trajectory by removing some of the repeated states and transitions. Denote by $T=(T_1, T_2, \ldots, T_n)$ the transitions generated from S using the disclosed techniques, e.g., as shown and described in reference to FIG. 2. Note that the $S_i$ and the $T_i$ are temporally ordered. Given three adjacent states $S_{i-1}$, $S_i$ and $S_{i+1}$ (for 1<i <n) and the corresponding two transitions $T_{i+1}$ and $T_i$, the trajectory representation S may be filtered (i.e., repeat states discarded) by using the following rule.

State Discard Rule

If transitions $T_{i-1}$ and $T_i$ are equal (or, for some examples, approximately equal, see below), then:

discard the state $S_i$ from S, discard the transition $T_i$ from T, and recalculate the transition $T_{i-1}$ according to the transition inference technique disclosed herein, e.g., as shown and described in reference to FIG. 2.

An alternative approach to the trajectory filtering can involve allowed error specifications. For example, two transitions can be concatenated when they are approximately equal, as described herein.

Thus, FIG. 4 describes the above technique in flowchart form. In particular, blocks 404-412 of FIG. 4 represent an implementation of the State Discard Rule for approximately equal states.

At block 402, the technique initializes i. More particularly, this block sets up the type of indexing and time information to be used for S and T. For example, this block establishes whether absolute time or relative time is used, and the specification and handling of the current state, the initial state, and any historical state information.

In some examples, the state vectors may be based on absolute time as follows. For representing the absolute time, independently from the local time zones and daylight saving time, some examples may use the number of milliseconds elapsed from the Unix Epoch (Jan. 1, 1970 at UTC). Such a reference point in time technically does not change independently from the location on the globe, which is very useful representation to computer systems in dynamic and distributed applications. The use of milliseconds may take advantage of the continuous representation of the trajectories and facilitates the implementation with integer numbers. The absolute time may only be used for the current and future states represented in the trajectory, for the reasons stated in the following.

Alternately, for some examples, the state vectors may be based on relative time information. In such examples, time may be represented as a number of milliseconds from a current (or reference) time instance.

The following conventions may be used, with respect to a current state, an initial state, and historical states. The "current state" is the state for at the first non-negative time instance t along the trajectory (which is t=0, in the case of relative time). The "initial state" can be specified by defining an additional state So as the first position of the trajectory with a negative time index (e.g., at t=−1000 milliseconds), which allows for inference of the initial state at $S_1$. Under this convention, velocity at the first state of the trajectory is always equal to zero, and the initial heading and pitch angles are defined by the pair of the first and second state in the trajectory (the transition between those states is always a straight line transitions, i.e., no turn occurs). "Historical state information" can be stored in the states that represent the trajectory by defining more than one state with negative time indices. The time of historical state information is relative to the current state. The current state does have to be included explicitly in the trajectory representation and can be determined from the state with the greatest value of the time index and the corresponding transition.

At block 404, the technique determines whether the current adjacent transitions are equal or approximately equal, i.e., whether they constitute a repeat transition. In some examples, this block detects whether the transitions are actually equal (or approximately equal, in some examples). If not, the index i is incremented (block 418) and control is passed to block 414. Otherwise, control passes to block 406.

At block 406, the technique discards the detected redundant state, and at block 408 the technique discards the detected repeat transition. The discarding may include removing the corresponding data from memory by, e.g., erasing the data or altering a pointer to the data.

At block 410, the technique recalculates the next transition. This block accounts for the removal of the repeat transition. The actions of this block may be performed as shown and described herein in reference to FIG. 2.

At block 412, the technique renumbers the states and transitions in order to account for the state discarded at block 406 and the transition discarded at block 408. Without this block, the index i may have a gap. Alternately, some examples omit this block, using instead the existing remaining indices.

At block 414, the technique decides whether more states and transitions are to be processed. This block may be decided by examining the index i and determining whether any indexed states and transitions remain to be considered. If not, then the process proceeds to block 416 and ends. Otherwise, the process returns to block 404 and processes the next set of states and transitions.

Figure 5:
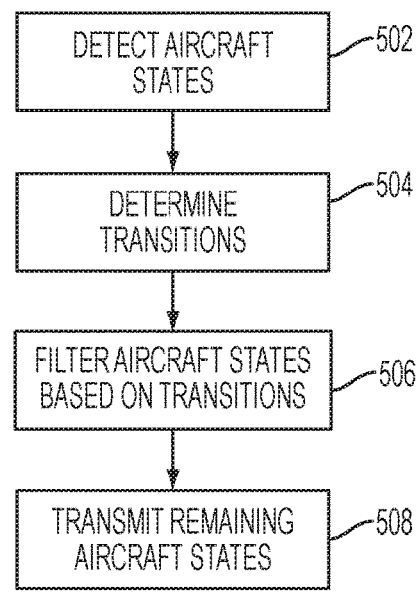
FIG. 5 is a flowchart of a technique for determining a four-dimensional (4D) trajectory of an aircraft without requiring aircraft performance data or meteorological data according to some examples.

FIG. 5 is a flowchart of a technique for determining a four-dimensional (4D) trajectory of an aircraft without requiring aircraft performance data or meteorological data according to some examples. The technique of FIG. 5 may be implemented by properly configured computer hardware, e.g., ground station and/or aircraft computer hardware as shown and described in reference to FIG. 7. The technique of FIG. 5 may be initiated at any point, not limited to an aircraft's initiation of a journey.

At block 502, the technique detects a plurality of aircraft states. The states may be as disclosed herein, i.e., quadruples consisting of geodetic coordinates of latitude, longitude, and altitude, together with a time parameter. The detection may be performed using any of a variety of expedients. For example, instrumentation of the aircraft itself may be used to determine any or all values in a state. Alternately, or in addition, ground systems, including RADAR, may be used to determine any of all values in a state. Per this block, states may be determined at regular temporal intervals, for example. Such intervals may be once every millisecond, every 10 milliseconds, every 100 milliseconds, every second, every two seconds, or every five seconds, by way of non-limiting examples. Alternately, or in addition, states may be determined at irregular intervals, but at least once every interval as described above.

At block 504, the technique determines transitions corresponding to the states determined at block 502. The actions of this block may be performed as shown and described herein in reference to FIG. 2.

At block 506, the technique filters the aircraft states based on the transitions determined at the prior block. The filtering may discard approximately equal transitions and associated states, as shown and described above in reference to FIG. 4. After block 506, the remaining states in the state sequence may be such that they do not form any constant transitions. That is, none of the transitions derived from the remaining states after block 506 may be constant.

At block 508, the technique transmits the remaining states once filtering has been performed. The transmission may be made using a wireless radio-frequency transmitter, for example, e.g., wireless transmission interface 708 of FIG. 7. The transmission may be from the aircraft to a ground station, or from a ground station to an aircraft, for example. The transmission may be made over one or more wires (e.g., for a datalink) from a first system aboard the aircraft (e.g., a Flight Management System, "FMS", or an Aircraft Communications Addressing and Reporting System, "ACARS"), to a second system aboard the aircraft (e.g., a Flight Management System, "FMS", or an Aircraft Communications Addressing and Reporting System, "ACARS"). More generally, the receiving entity may be any of a variety of entities. According to some embodiments, the receiving entity may be any, or a combination, of: an air traffic control system, an Automatic Dependent Surveillance—Contract (ADS-C) system, an FMS, an ACARS, a system aboard another aircraft, or a system within the aircraft which trajectory is being represented.

Once the receiving entity has received the remaining states, it may obtain and/or reconstitute the aircraft's trajectory and/or flight parameters derivable therefrom. For example, the receiving entity may determine, from the received states, any of the following flight parameters at any selected time between the temporal outer boundaries of the received states: speed, heading, planar turn radius, pitch, vertical turn radius, acceleration, altitude, latitude, and/or longitude. Values for these flight parameters may be extracted from the states themselves directly, or may be derived therefrom, e.g., as shown and described in reference to FIG. 2, above.

The receiving entity, or another entity that has access to the aircraft's flight parameters derivable from the states sent to the receiving entity, may use such flight parameters for any of a variety of purposes.

For example, an FMS or other system may update a flight plan (e.g., a preexisting flight plan) to better represent the aircraft's actual trajectory and/or account for any deviations from a filed flight plan. Such a flight plan may be an Instrument Flight Rules (IFR) or Visual Flight Rules (VFR) flight plan. The flight plan may be updated via an Aircraft Communications Addressing and Reporting System (ACARS), an ADS-C system, or a related ground control communications system, for example. The updated flight plan may be electronically stored in the FMC aboard the aircraft, at a ground system such as an air traffic control system, or both.

As another example, an FMS within the aircraft itself may use the flight parameters to control the flight of the aircraft, e.g., by increasing or reducing speed, altering a heading, pitch, or turn radius, or otherwise adjusting an intended trajectory. The FMS within the aircraft may do so by, e.g., alerting a pilot that the aircraft has strayed from its intended flight parameters, by providing feedback and/or control signals to an autopilot system, or by displaying the actual trajectory, possibly together with the intended trajectory, for example.

Yet another application area is efficient conflict detection and resolution. That is, a receiving entity, such as an air traffic control system, may predict that a first aircraft's future trajectory, as determined using the disclosed techniques, will intercept or potentially create a near-miss situation with a second aircraft, which may also provide its state data to the same or a different receiving entity for construction of its respective trajectory.

Another application of the disclosed techniques includes using the state data as an intermediate representation of reference trajectories in the FMS, e.g., as a step between a flight plan and respective aircraft intent.

Figure 6:
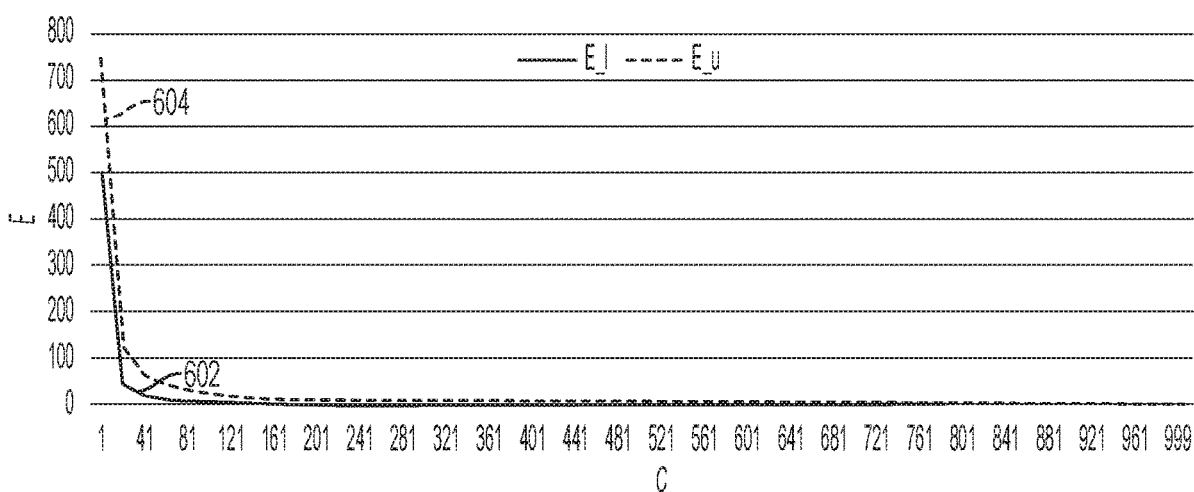
FIG. 6 is a graph depicting upper and lower efficiency bounds according to some examples.

FIG. 6 is a graph depicting upper and lower efficiency bounds according to some examples. That is, FIG. 6 illustrates bounds on the efficiency of the disclosed 4D trajectory representation technique.

Assume two representations of a 4D trajectory defined by two series of 4D state points. The series $S_d$ denotes a series of 4D trajectory points sampled at a certain mean frequency f over a period of time $\Delta t$ and unfiltered. The series $S_c$ denotes a series of 4D state points that describe the trajectory according to an example, and contains no constant transitions. The relative efficiency E of representing 4D trajectories according to disclosed examples can be determined according to the ratio $E=L_d/L_c$, where $L_c$ is the length of the continuous trajectory represented by the series $S_c$ (i.e., the total number of states required for the trajectory to be correctly specified) and $L_d$ is the length of a discrete trajectory given by $S_d$ and is equal to $L_d=1+f\cdot\Delta t$.

The length $L_c$ is closely related to the total number of changes in all transitions c. Given that, according to some examples, the maximum number of simultaneous changes in one transition is three, and the number of transitions in the representation $S_d$ is equal to $L_d-1$, it is possible to determine the maximum number of changes in a discrete (input) 4D trajectory of length $L_d$ as $c_{max}=3(L_d-1)=3$ f·$\Delta t$. In such case there exist a transition with three changes between each two states, thus the lengths of the two representations are equal (i.e., $L_c=L_d$).

The minimum number of changes $c_{min}=1$ occurs in the degenerate case of a horizontally/vertically straight trajectory with a velocity change (acceleration), so that the total number of changes c can be a value from within the range $c_{min} \le c \le c_{max}$, where $1 \le c \le 3(L_d-1)$, $c_{min}+1 \le L_c \le L_d$, and $2 \le L_c \le L_d$.

Thus, the efficiency is upper-bounded by $E_u = L_d/(c_{min}+1)=L_d/2$ and lower-bounded by $E_l=L_d/L_d=1$.

Because each transition defined for the series contains at least one change, then given c changes, the length $L_c$ can is a value from within the range $1+c/3 \le L_c \le 1+c$. Then the upper and lower bounds on the efficiency of the representation are given respectively as functions of the number of transitions by $E_u(c)=L_d/(1+c/3)$, and $E_l(c)=L_d/(1+c)$. Thus, FIG. 6 shows efficiency upper bound 604 and efficiency lower bound 602 as functions of the number of transition changes.

An illustrative example of cost savings follows. For a typical discrete 4D trajectory sampled at the frequency of 1 Hz with 6-hour (3600 seconds) duration and 100 changes in total, the efficiency of data representation ranges from $E_l=34.6$ up to $E_u=104.9$. Assuming transmission of data over expensive and low-bandwidth medium such as, e.g., ACARS, for the transmission cost of a byte of data equal to $0.001, a fleet of 270 aircraft flying 200 days in a year, and 10 transmissions of 1000 points (4×4-byte values) per flight, the overall cost could be k=0.001×270×200×10×1000×4× 4=$ 8,640,000.

The potential minimum savings resulting from the efficient representation in the example case can be computed as $s_{min}$=$8,640,000−($8,640,000/34.6)=$8,640,000−$249, 711=$8,390,289, which is over 97% of the overall cost. The potential maximum savings may be computed as $s_{max}$=$8, 640,000−($8,640,000/104.9)=$8,640,000−$82,364=$8,557, 636, which is over 99% of the overall cost. Both cases show that the overall annual cost of transmitting 4D trajectories could be almost eliminated when using the disclosed techniques.

Thus, the results of these investigations show that the disclosed techniques have the potential to bring meaningful savings (over 95% in the analyzed case) in applications related to 4D trajectory date transmission, when compared to the traditional discrete 4D trajectory representation, without sacrificing accuracy.

Note that the transmitted aircraft states may be subjected to a compression algorithm prior to transmission, further reducing the size of the transmitted data.

Figure 7:
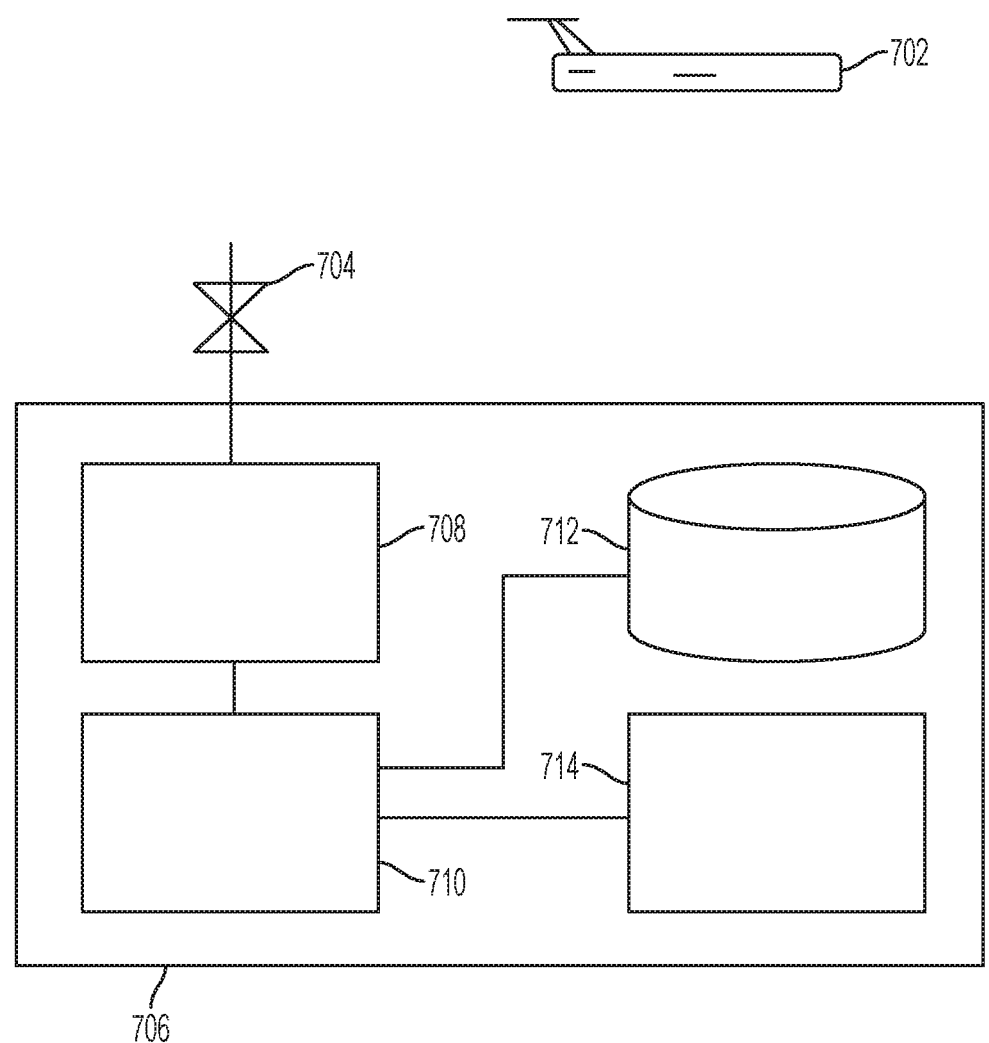
FIG. 7 depicts example implementation hardware according to some examples.

FIG. 7 depicts example implementation hardware according to some examples. The techniques disclosed herein, e.g., in reference to FIG. 5, may be implemented using the system shown and described in reference to FIG. 7. In particular, FIG. 7 depicts aircraft 702 in communication with ground station 706. Aircraft 702 may be any type of aircraft, not limited to fixed-wing airplanes. Thus, aircraft 702 may be a helicopter, for example. Ground station may be included within, communicatively coupled to, or distinct from, a terrestrial air traffic control system.

Ground station 706 may include one or more electronic processors 710, communicatively coupled to computer readable media 712 (e.g., persistent memory), signal co-processor 714, and wireless transmission interface 708. Processor(s) 710 may form part of an electronic computer, for example. Signal co-processor 714 may be used to perform the signal processing operations disclosed herein, e.g., any, or any combination, of: determining, filtering, and transmitting state data, and/or reconstituting a trajectory from received state data. Wireless transmission interface 708 may be coupled to antenna 704, which sends and receives data wirelessly to/from aircraft 702. Computer readable media 712 may include computer-interpretable instructions which, when executed by processor(s) 710 and/or signal co-processor 714, cause ground station 706 to perform one or more of the techniques disclosed herein.

Note that aircraft 702 of FIG. 2 may include hardware and software identical or analogous to the hardware and software in ground station 706. For example, aircraft 702 may include one or more electronic processors, communicatively coupled to computer readable media (e.g., persistent memory), to a signal co-processor, and to a wireless transmission interface. The processor(s) may form part of an electronic computer, for example. The signal co-processor may be used to perform the signal processing operations disclosed herein, e.g., any, or any combination, of: determining, filtering, and transmitting state data, and/or reconstituting a trajectory from received state data. The wireless transmission interface may be coupled to an antenna of aircraft 702, which sends and receives data wirelessly to/from ground station 706. The computer readable media may include computer-interpretable instructions which, when executed by the aircraft's processor(s) and/or signal co-processor, cause aircraft 702 to perform one or more of the techniques disclosed herein.

Examples are not limited to the communications between the example endpoints described herein. For example, examples may provide state information between intra-aircraft systems, or the state information may be communicated between aircraft.

Although examples have been described in reference to aircraft trajectories, other forums are also possible for implementations. Examples have the potential to be used by any other companies that involve in their products trajectory processing or transmission. In particular, the following sectors may utilize examples: Aerospace (e.g., for trajectory processing and transmission in avionics, ATM, space), Automotive (e.g., for trajectory processing and transmission for ground vehicles and road systems), Navigation (e.g., for trajectory processing in navigation products such as GPS devices), and Software (e.g., for trajectory processing and transmission in software products such as on-line maps and routing services).

Certain examples described above can be performed in part using a computer application or program. The computer program can exist in a variety of forms, both active and inactive. For example, the computer program can exist as one or more software programs, software modules, or both, that can be comprised of program instructions in source code, object code, executable code or other formats, firmware program(s), or hardware description language (HDL) files. Any of the above can be embodied on a computer readable medium, which can include computer readable storage devices and media in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes.

Those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of updating a flight plan of an aircraft (702), the method comprising:
   detecting (502) a plurality of aircraft states (102) of the aircraft (702), each aircraft state (102) comprising a latitude value, a longitude value, an altitude value, and a time value, whereby the plurality of states (102) of the aircraft are stored in electronic memory (712) in temporal order;
   determining (504), for each of a plurality of pairs of adjacent aircraft states (102), a respective aircraft transition (104), each transition comprising a planar turn radius (208) value, a vertical turn radius (218) value, and an acceleration (230) value, whereby a plurality of aircraft transitions (104) are stored in electronic memory (712) in temporal order;
   detecting (506) a plurality of pairs of repeat adjacent aircraft transitions (104) comprising: respective planar turn radii (208) values whose difference is no more than a first threshold, respective vertical turn radii (218) values whose difference is no more than a second threshold, and respective acceleration (230) values whose difference is no more than a third threshold;
   discarding (506), for each pair of repeat adjacent aircraft transitions, a respective aircraft state (104) from the plurality of aircraft states (104), whereby an amount of data for the plurality of states of the aircraft stored in electronic memory (712) is reduced;
   electronically transmitting (508) from a first aircraft (792) system to a Flight Management System (FMS) the plurality of aircraft states (104) after the discarding; and
   updating, by the FMS, a flight plan for the aircraft (702) to represent at least a portion of a trajectory interpolated from the plurality of aircraft states (104), whereby an updated flight plan is produced.

2. The method of claim 1, wherein the detecting (506) is performed by the aircraft.

3. The method of claim 1, wherein the detecting (506) is performed by a terrestrial system.

4. The method of claim 1, wherein the determining (504), for each of the plurality of pairs of adjacent aircraft states (102), the respective aircraft transition (104) comprises computing respective headings (202) at each aircraft state (102) of a respective pair of adjacent aircraft states (102).

5. The method of claim 1, wherein the determining (504), for each of the plurality of pairs of adjacent aircraft states (102), the respective aircraft transition (104) comprises computing respective pitches (212) at each aircraft state (102) of a respective pair of adjacent aircraft states (102).

6. The method of claim 1, wherein the determining (504), for each of the plurality of pairs of adjacent aircraft states (102), the respective aircraft transition (104) comprises computing respective speeds (222) at each aircraft state (102) of a respective pair of adjacent aircraft states (102).

7. The method of claim 1, wherein the electronically transmitting (508) comprises electronically transmitting (508) from the aircraft (702) to a ground station (706).

8. The method of claim 1, wherein the electronically transmitting (508) comprises electronically transmitting (508) from a ground station (706) to the aircraft (702).

9. The method of claim 1, wherein the first threshold, the second threshold, and the third threshold are all zero.

10. The method of claim 1, further comprising:
   directing, by the FMS, the aircraft to follow the updated flight plan.

11. A system for updating a flight plan of an aircraft (702), the system comprising:
   a communications interface (708) configured to detect (502) a plurality of aircraft states (102) of the aircraft, each aircraft state (102) comprising a latitude value, a longitude value, an altitude value, and a time value, whereby the plurality of states (102) of the aircraft are stored in electronic memory (712) in temporal order;
   at least one electronic processor (710) configured to:
      determine (504), for each of a plurality of pairs of adjacent aircraft states (102), a respective aircraft transition (104), each transition (104) comprising a planar turn radius (208) value, a vertical turn radius (218) value, and an acceleration (230) value;
      store a plurality of aircraft transitions (104) in electronic memory (712) in temporal order;
      detect (506) a plurality of pairs of repeat adjacent aircraft transitions (104) comprising: respective planar turn radii (208) values whose difference is no more than a first threshold, respective vertical turn radii (218) values whose difference is no more than a second threshold, and respective acceleration (230) values whose difference is no more than a third threshold;
      discard (506) from the electronic memory (712), for each pair of repeat adjacent aircraft transitions (104), a respective aircraft state (102) from the plurality of aircraft states (102), whereby a filtered plurality of aircraft states is produced, and whereby an amount of data stored in electronic memory (712) is reduced; and
   a transmitter (708) configured to electronically transmit the filtered plurality of aircraft states (102) from a first aircraft (702) system to a Flight Management System (FMS) configured to update a flight plan for the aircraft (702) to represent at least a portion of a trajectory interpolated from the plurality of aircraft states (104), whereby an updated flight plan is produced.

12. The system of claim 11, further comprising instrumentation aboard the aircraft (702) configured to detect (502) the plurality of aircraft states (102) of the aircraft (702).

13. The system of claim 11, further comprising instrumentation present in a ground station (706) configured to detect the plurality of aircraft states (102) of the aircraft (702).

14. The system of claim 11, wherein the at least one electronic processor (710) configured to determine, for each of the plurality of pairs of adjacent aircraft states (102), the respective aircraft transition (104) is further configured to compute respective headings (202) at each aircraft state (102) of a respective pair of adjacent aircraft states (102).

15. The system of claim 11, wherein the at least one electronic processor (710) configured to determine, for each of the plurality of pairs of adjacent aircraft states (102), the respective aircraft transition (104) is further configured to compute respective pitches (212) at each aircraft state (102) of a respective pair of adjacent aircraft states (102).

16. The system of claim 11, wherein the at least one electronic processor (710) configured to determine, for each of the plurality of pairs of adjacent aircraft states (102), the respective aircraft transition (104) is further configured to compute respective speeds (222) at each aircraft state (102) of a respective pair of adjacent aircraft states (102).

17. The system of claim 11, wherein the transmitter (708) comprises a wireless transmitter (708) present aboard the aircraft (702).

18. The system of claim 11, wherein the transmitter (708) comprises a wireless transmitter (708) present at a ground station (706).

19. The system of claim 11, wherein the first threshold, the second threshold, and the third threshold are all zero.

20. The system of claim 11, wherein the FMS is further configured to direct the aircraft to follow the updated flight plan.

* * * * *